US012772241B2

(12) United States Patent
Zhang et al.

(10) Patent No.: US 12,772,241 B2
(45) Date of Patent: Oct. 20, 2026

(54) UPDATING UPLINK TRANSMISSION CONFIGURATION BASED ON UPLINK TRAFFIC ASSISTANCE INFORMATION

(71) Applicant: Lenovo (Beijing) Limited, Beijing (CN)

(72) Inventors: Congchi Zhang, Shanghai (CN); Mingzeng Dai, Shanghai (CN); Jing Han, Beijing (CN); Lianhai Wu, Beijing (CN); Haiyan Luo, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 227 days.

(21) Appl. No.: 18/687,980

(22) PCT Filed: Aug. 30, 2021

(86) PCT No.: PCT/CN2021/115403
§ 371 (c)(1),
(2) Date: Feb. 29, 2024

(87) PCT Pub. No.: WO2023/028770
PCT Pub. Date: Mar. 9, 2023

(65) Prior Publication Data
US 2024/0357587 A1 Oct. 24, 2024

(51) Int. Cl.
*H04W 72/1268* (2023.01)
*H04W 72/542* (2023.01)

(52) U.S. Cl.
CPC ..... *H04W 72/1268* (2013.01); *H04W 72/542* (2023.01)

(58) Field of Classification Search
CPC ........... H04W 72/1268; H04W 72/542; H04L 5/0053; H04L 5/006; H04L 5/0091
See application file for complete search history.

(56) References Cited

U.S. PATENT DOCUMENTS

| | | | | |
|---|---|---|---|---|
| 9,907,059 B1 * | 2/2018 | Zhou | ..................... | H04L 5/0007 |
| 2017/0048804 A1 * | 2/2017 | Wang | .................... | H04W 52/34 |
| 2018/0063300 A1 * | 3/2018 | Chiu | ..................... | H04L 69/324 |

(Continued)

FOREIGN PATENT DOCUMENTS

| | | | | |
|---|---|---|---|---|
| CN | 110856267 A | 2/2020 | | |
| EP | 3857944 B1 * | 4/2025 | ........... | H04W 72/54 |

(Continued)

OTHER PUBLICATIONS

U.S. Appl. No. 63/091,244, filed Oct. 13, 2020 (Year: 2020).*

(Continued)

*Primary Examiner* — Sun Jong Kim
(74) *Attorney, Agent, or Firm* — FIG. 1 Patents

(57) ABSTRACT

Various aspects of the present disclosure relate to methods and apparatuses for uplink (UL) transmission. A method may include: receiving configuration information from a base station (BS) for UL traffic from a user equipment (UE); transmitting assistance information related to the UL traffic that is transmitted from the UE to the BS; and in response to transmitting the assistance information from the UE to the BS, receiving updated configuration information from the BS for subsequent UL traffic from the UE.

20 Claims, 3 Drawing Sheets

(56) References Cited

U.S. PATENT DOCUMENTS

| | | | | |
|---|---|---|---|---|
| 2019/0320491 | A1 | 10/2019 | Shukair et al. | |
| 2020/0314862 | A1* | 10/2020 | Wu | H04W 28/0268 |
| 2021/0321425 | A1* | 10/2021 | Ohta | H04W 72/21 |
| 2022/0116987 | A1* | 4/2022 | Chin | H04W 72/1268 |
| 2023/0180276 | A1* | 6/2023 | Gerami | H04W 72/02 370/329 |

FOREIGN PATENT DOCUMENTS

| | | | |
|---|---|---|---|
| WO | 2020033785 | A1 | 2/2020 |
| WO | 2020064215 | A1 | 4/2020 |
| WO | 2021167529 | A1 | 8/2021 |

OTHER PUBLICATIONS

PCT/CN2021/115403 , "International Preliminary Report on Patentability", International Application No. PCT/CN2021/115403, Mar. 5, 2024, 4 pages.

PCT/CN2021/115403 , "International Search Report and Written Opinion", International Application No. PCT/CN2021/115403, May 27, 2022, 6 pages.

* cited by examiner

UPDATING UPLINK TRANSMISSION CONFIGURATION BASED ON UPLINK TRAFFIC ASSISTANCE INFORMATION

TECHNICAL FIELD

Embodiments of the present application generally relate to wireless communication technology, and especially to methods and apparatuses for uplink (UL) transmission.

BACKGROUND

Extended reality (XR), including augmented reality (AR) and virtual reality (VR), as well as cloud gaming (CG), presents a new promising category of connected devices, applications, and services. As a potential working area of 3GPP (3rd generation partnership project) Rel-18, power saving of an XR device is one of key topics.

In some scenarios, the UL traffic (e.g., posing information) of the XR service may be transmitted periodically in configured grants provided by a base station (BS). However, different from the downlink (DL) transmission in which the BS is able to understand the delay between DL data arrival and DL data transmission, in UL transmission, the BS is not able to understand the delay between the UL data arrival and UL data transmission, and thus there is mismatch between the UL data arrival time and the configured grants provided by the BS. Given this, how to solve the mismatch between the UL data arrival time and the configured grants is needed to be addressed.

In some other scenarios, the UL traffic (e.g., posing information) of the XR service may be triggered by some events (e.g., a view direction change exceeds a threshold). In these scenarios, the UL traffic usually triggers a DL transmission. Then, how to perform a discontinuous reception (DRX) operation after transmitting the UL traffic so as to save power of a user equipment (UE) is also needed to be addressed.

Given the above, it is desirable to provide improved technology for UL transmission, which can at least resolve the above issues, so as to support XR service by considering the uplink traffic characteristics.

SUMMARY OF THE DISCLOSURE

Embodiments of the present application at least provide a technical solution for UL transmission.

According to some embodiments of the present application, a method performed by a UE may include: receiving configuration information from a BS for UL traffic from the UE; transmitting assistance information related to the UL traffic that is transmitted from the UE to a BS; and in response to transmitting the assistance information from the UE to the BS, receiving updated configuration information from the BS for subsequent UL traffic from the UE.

According to some embodiments of the present application, a method performed by the BS may include: transmitting configuration information for UL traffic from a UE to the BS; receiving, from the UE, assistance information related to the UL traffic that is transmitted from the UE to the BS; and in response to receiving the assistance information from the UE, transmitting, to the UE, updated configuration information to the UE for subsequent UL traffic from the UE.

Some other embodiments of the present application also provide a UE, including: a processor; and a transceiver coupled to the processor, wherein the processor is configured to receive configuration information from a BS for UL traffic from the UE; transmit, to the BS, assistance information related to UL traffic that is transmitted from the UE to the BS; and in response to transmitting the assistance information to the BS, receive updated configuration information from the BS for subsequent UL traffic from the UE.

Some other embodiments of the present application also provide a BS, including: a processor; and a transceiver coupled to the processor, wherein the processor is configured to transmit configuration information for UL traffic from a UE to the BS; receive, from the UE, assistance information related to the UL that is transmitted from the UE to the BS; and in response to receiving the assistance information from the UE, transmit, to the UE, updated configuration information to the UE for subsequent UL traffic from the UE.

Embodiments of the present application provide a technical solution for UL transmission, which can provide a more dynamic and timely delay report to the network so as to solve the mismatch between the UL data arrival and configured grant occurrence, and provide an efficient mechanism for DRX operation in uses cases where a UL transmission triggers a DL transmission, thereby saving power of the UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G (i.e., new radio (NR)), 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
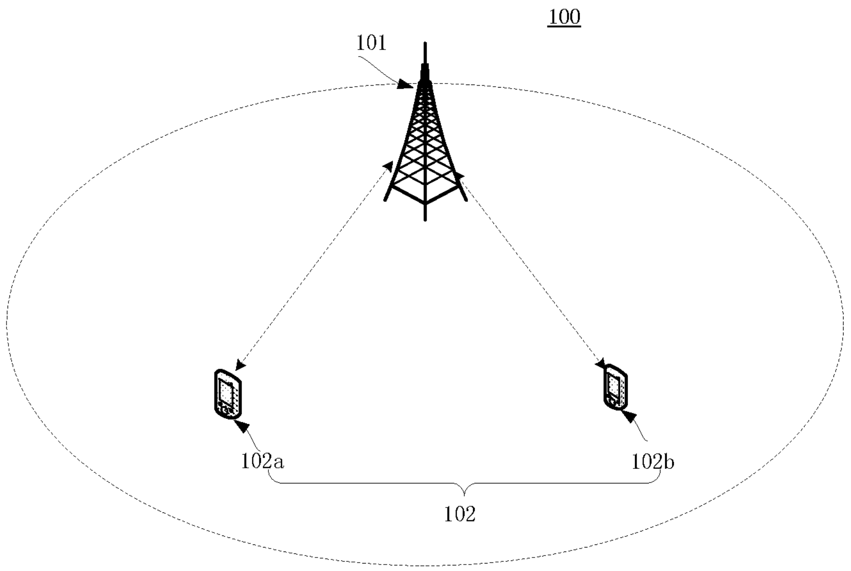
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UEs 102 (e.g., a UE 102*a* and a UE 102*b*) for illustrative purpose. Although a specific number of BS 101 and UEs 102 are depicted in FIG. 1, it is contemplated that any number of BSs 101 and UEs 102 may be included in the wireless communication system 100.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as a NG-RAN node, a RAN node, an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

According to some embodiments of the present application, the UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present application, the UE(s) 102 may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present application, the UE(s) 102 may include wearable devices, such as smart watches, fitness bands, optical head-mounted displays, or the like.

Moreover, the UE(s) 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

Both the UE 102*a* and the UE 102*b* in the embodiments of FIG. 1 may transmit information to the BS 101 and receive control information from the BS 101, for example, via LTE or NR Uu interface.

XR, including AR and VR, as well as CG, presents a new promising category of connected devices, applications, and services. A UE with an XR service can be referred to as an XR device.

Figure 2:
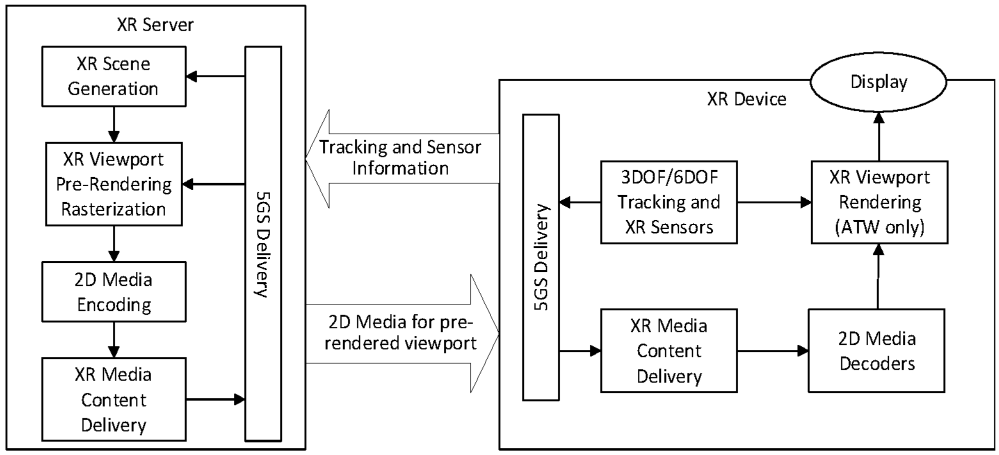
FIG. 2 illustrates an exemplary framework for raster-based split rendering according to some embodiments of the present application.

In TR 26.928, many types of joint rendering between XR device and XR server are discussed. As an example, FIG. 2 illustrates an exemplary framework for raster-based split rendering according to some embodiments of the present application. Raster-based split rendering refers to the case where the XR Server runs an XR engine to generate the XR Scene based on information coming from an XR device. The XR Server rasterizes the XR viewport and does XR pre-rendering. FIG. 2 is the same as FIG. 6.2.5-1 in TR 26.928.

Referring to FIG. 2, the XR serve may have following capabilities:

XR scene generation;

XR viewport pre-rendering rasterization;

2D media encoding;

XR media content delivery and 5G system (5GS) Delivery.

The XR device may have following components and/or capabilities:

3DOF/6DOF tracking and XR sensors;

XR viewport rendering;

2D media decoders;

XR media content delivery and 5G system (5GS) Delivery.

According to FIG. 2, the viewport is pre-dominantly rendered in the XR server, but the device is able to do latest pose correction, for example by asynchronous time-warping (ATW) or other XR pose correction to address changes in the pose, e.g., XR graphics workload is split into rendering workload on a powerful XR server (in the cloud or the edge) and pose correction (such as ATW) on the XR device;

Low motion-to-photon latency is preserved via on device ATW or other pose correction methods.

The following procedure highlights key steps for joint rendering between the XR device and the XR server, including:

1) An XR device connects to the network and joins XR application, including:
   a) The XR device sends static device information and capabilities (supported decoders, viewport).
2) Based on this information, the XR server sets up encoders and formats.
3) A Loop is performed by the XR device and the XR service, including the following steps:
   a) XR device collects XR pose (or a predicted XR pose);
   b) XR pose is sent to XR server;
   c) The XR server uses the pose to pre-render the XR viewport;
   d) XR viewport is encoded with 2D media encoders;
   e) The compressed media is sent to XR device along with XR pose that it was rendered for;
   f) The XR device decompresses video; and
   g) The XR device uses the XR pose provided with the video frame and the actual XR pose for an improved prediction and to correct the local pose, e.g. using ATW.

Depends on the deployment of the collaboration between the XR device and the XR, in some cases, the UL traffic from the XR device may be transmitted periodically. For example, the XR device may send posing information in uplink to the XR server to assist the frame rendering in XR server. In these cases, since the typical XR DL frame rates are 60 or 120 frames per seconds (fps), of which frame periodicities are 16.67 ms, 8.33 ms, the posing information update in uplink may have the same period as the frame transmission in downlink.

For periodic UL traffic, the BS may transmit configured grants for the UE in which the UE may transmit the periodic UL traffic. However, different from the DL transmission in which the BS is able to understand the delay between DL data arrival and DL data transmission, in UL transmission, the BS is not able to understand the delay between the UL data arrival and UL data transmission, and thus there is mismatch between the UL data arrival time and the configured grants provided by the BS. In existing technology, the UE may report an average packet data convergence protocol (PDCP) delay periodically via a measurement report to the BS. However, the periodic PDCP delay is not enough to solve the above technical problem. More dynamic delay report reflecting each uplink transmission is required.

In addition, as a potential working area of 3GPP Rel-18, power saving of an XR device is a key topic. DRX is a key feature for power saving in a UE. Specifically, it allows the UE to stop monitoring physical downlink control channel (PDCCH) when there is no data activity, thereby saving power. Given this, the XR device may be configured to perform a DRX operation to save power.

However, in some cases, the UL traffic (e.g., posing information) of the XR service may be triggered by some events. In these scenarios, the UL traffic usually triggers a DL transmission. For example, if the XR server has rendered and provided all frames within a range of view angles, then the posing information update in uplink could be triggered by some events, e.g. the view direction change exceeds a threshold. In this case, assuming that a DRX has been configured to UE for the power saving purpose, then how to perform a DRX operation after transmitting the UL traffic so as to save power of the XR device is also needed to be addressed.

Given the above, embodiments of the present application provide a technical solution for UL transmission, which can provide more dynamic and timely delay report to the network, such that the network may adjust the configured grants dynamically, there by solving the mismatch between the UL data arrival and configured grant occurrence. In addition, the technical solution for UL transmission also can provide an efficient mechanism for DRX operation in uses cases where a UL transmission triggers a DL transmission, thereby saving power of the UE. Accordingly, embodiments of the present application can support XR service by considering the uplink traffic characteristics. More details on embodiments of the present application will be illustrated in the following text in combination with the appended drawings.

Figure 3:
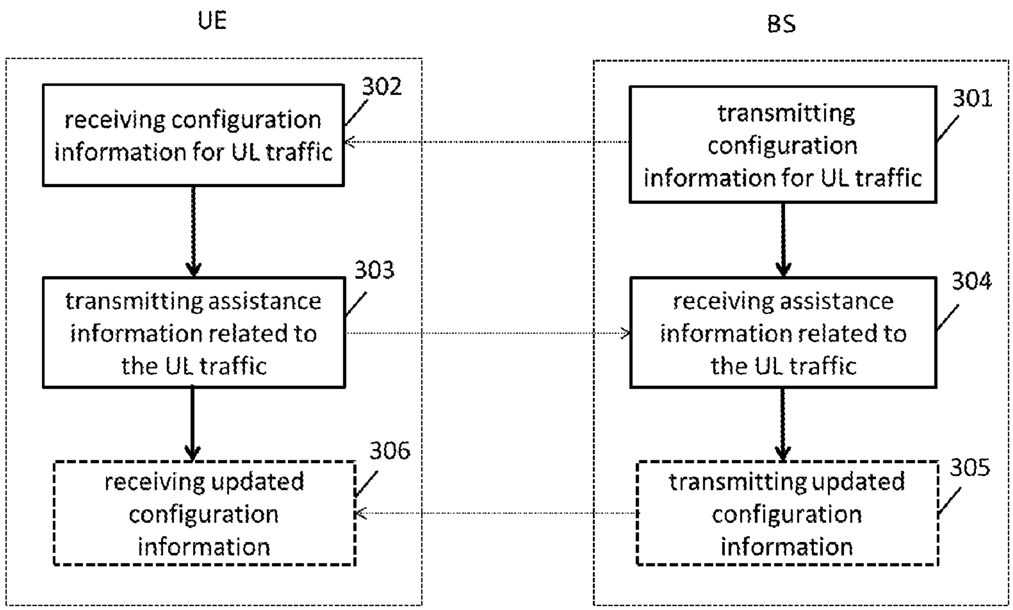
FIG. 3 illustrates an exemplary flowchart of a method for UL transmission according to some other embodiments of the present application.

FIG. 3 illustrates an exemplary flowchart of a method for UL transmission according to some embodiments of the present application. Although the method is illustrated in a system level by a UE (e.g., UE 102*a* or UE 102*b* in FIG. 1) and a BS (e.g., BS 101), persons skilled in the art can understand that the method implemented in the UE and the method implemented in the BS can be separately implemented and incorporated in other apparatus with the like functions. In the embodiments of FIG. 3, the UE may provide an XR service, and thus may be referred to as an XR device.

In the exemplary embodiments shown in FIG. 3, in step 301, the BS may transmit configuration information for UL traffic to the UE. The UE traffic may be transmitted from the UE to the BS. The configuration information may include at least one of: bandwidth part (BWP) for the UL traffic, configured grants for the UL traffic, DRX configuration for the UE, and so on. Consequently, in step 302, the UE may receive the configuration information from the BS.

In step 303, the UE may transmit assistance information related to the UL traffic to the BS.

According to some embodiments of the present application, the assistance information may include an UL scheduling delay.

In some embodiments of the present application, the assistance information including the UL scheduling delay may be transmitted in a medium access control (MAC) control element (CE) in a MAC protocol data unit (PDU), wherein the MAC CE is associated with a logical channel (LCH) identity (ID).

In such embodiments, before transmitting the UL scheduling delay in the MAC CE in step 303, the UE may measure the UL scheduling delay based on a difference between a start time point and a time of a configured grant for transmitting the MAC PDU. The start time point may be one of the followings:

- an arrival time of the earliest arriving MAC service data unit (SDU) of all MAC SDUs contained in the MAC PDU to be transmitted. For example, assuming that the MAC PDU includes five MAC SDU, which arrive at the MAC layer in 1$^{st}$ millisecond, 2$^{nd}$ millisecond, 3$^{rd}$ millisecond, 4$^{th}$ millisecond, and 5$^{th}$ millisecond, then the start time point may be the 1$^{st}$ millisecond.
- an arrival time of the latest arriving MAC SDU of all MAC SDUs contained in the MAC PDU to be transmitted. For example, assuming that the MAC PDU includes five MAC SDU, which arrive at the MAC layer in 1$^{st}$ millisecond, 2$^{nd}$ millisecond, 3$^{rd}$ millisecond, 4$^{th}$ millisecond, and 5$^{th}$ millisecond, then the start time point may be the 5$^{th}$ millisecond.
- an average arrival time of all MAC SDUs contained in the MAC PDU to be transmitted. For example, assuming that the MAC PDU includes five MAC SDU, which arrive at the MAC layer in 1st millisecond, 2nd millisecond, 3rd millisecond, 4th millisecond, and 5th millisecond, then the start time point may be the 3$^{rd}$ millisecond.
- an arrival time of data earliest arriving at one or more radio bearers (RBs) or LCHs, wherein data arriving at one or more RBs or LCHs is contained in the MAC PDU to be transmitted. In this case, each RB of the one or more RBs may be a data radio bearer (DRB) or a signalling radio bearer (SRB). The arrival time of data arriving at a RB may be determined by a PDCP layer, and the arrival time of data arriving at a LCH may be determined by a radio layer control (RLC) layer. For example, assuming that there are five RBs (corresponding five LCHs), data arriving at the five RBs is 1$^{st}$ millisecond, 2nd millisecond, 3rd millisecond, 4th millisecond, and 5th millisecond, then the start time point may be the 1$^{st}$ millisecond.
- an arrival time of data latest arriving at one or more RBs or LCHs, wherein data arriving at one or more RBs or LCHs is contained in the MAC PDU to be transmitted. In this case, each RB of the one or more RBs may be a DRB or an SRB. The arrival time of data arriving at a RB may be determined by a PDCP layer, and the arrival time of data arriving at a LCH may be determined by a RLC layer. For example, assuming that there are five RBs (corresponding to five LCHs), data arriving at the five RBs is 1$^{st}$ millisecond, 2$^{nd}$ millisecond, $3^{rd}$ millisecond, $4^{th}$ millisecond, and $5^{th}$ millisecond, then the start time point may be the $5^{th}$ millisecond.

an average arrival time of data arriving at one or more RBs or LCHs, wherein data arriving at one or more RBs or LCHs is contained in the MAC PDU to be transmitted. Each RB of the one or more RBs may be a DRB or an SRB. The arrival time of data arriving at a RB may be determined by a PDCP layer, and the arrival time of data arriving at a LCH may be determined by a RLC layer. For example, assuming that there are five RBs (corresponding to five LCHs), data arriving at the five RBs is $1^{st}$ millisecond, $2^{nd}$ millisecond, $3^{rd}$ millisecond, $4^{th}$ millisecond, and $5^{th}$ millisecond, then the start time point may be the $3^{rd}$ millisecond.

The time of a configured grant may be a start time of the configured grant, an end time of the configured grant, and any other time during the configured grant. In an embodiment of the present application, the UL scheduling delay may be equal to a difference between the start time point and a start time of the configured grant for transmitting the MAC PDU.

In an embodiment of the present application, before measuring the UL scheduling delay, the UE may be configured by the BS to measure the UL scheduling delay for one or more specific MAC SDUs, data arrivals from one or more specific RBs (e.g., a DRB or an SRB), or data arrivals from one or more LCHs. That is, the BS may transmit information to the UE, the information may configure measurement of the UL scheduling delay for one or more MAC SDUs, data from one or more RBs, or data from one or more LCHs. After receiving the information, the UE may determine to measure the UL scheduling delay for the configured one or more MAC SDUs, one or more RBs, or one or more LCHs.

In an embodiment of the present application, the assistance information further indicates one or more RBs or one or more LCHs for which the UL scheduling delay is measured. For example, the assistance information may include the IDs of the one or more RBs or one or more LCHs.

In an embodiment of the present application, the assistance information has a priority higher than a priority of an UL data transmission. That is, the assistance information in the MAC CE is sent before sending UL data. For example, when UE generates a MAC PDU to be transmitted in UL and a MAC CE including the assistance information (which includes the UL scheduling delay) is to be included in the MAC PDU, the UE may include the MAC CE in the MAC PDU before adding additional MAC SDUs for UL data transmission.

In some other embodiments of the present application, the assistance information may be transmitted in a MAC sub-header in a MAC PDU, wherein the MAC sub-header is associated with a MAC SDU.

In such embodiments, before transmitting the UL scheduling delay in the MAC sub-header in step 303, the UE may measure the UL scheduling delay based on a difference between a start time point and a time of a configured grant for transmitting the MAC PDU. The start time point may be one of the followings:

an arrival time of the MAC SDU associated with the MAC sub-header. For example, assuming that the arrival time of the MAC SDU arriving at the MAC layer is $1^{st}$ millisecond, then the start time point may be the $1^{st}$ millisecond.

an arrival time of data arriving at a RB or a LCH associated with the MAC SDU. In this case, the RB may be a DRB or an SRB. The arrival time of data arriving at a RB may be determined by a PDCP layer, and the arrival time of data arriving at a LCH may be determined by a RLC layer. For example, assuming that the arrival time of data arriving at the RB is $1^{st}$ millisecond, then the start time point may be the $1^{st}$ millisecond.

The time of a configured grant may be a start time of the configured grant, an end time of the configured grant, and any other time during the configured grant. In an embodiment of the present application, the UL scheduling delay may be equal to a difference between the start time point and a start time of the configured grant for transmitting the MAC PDU.

In an embodiment of the present application, before measuring the UL scheduling delay, the UE may be configured by the BS to measure the UL scheduling delay for a specific MAC SDU, data arrival from a specific RB (e.g., a DRB or an SRB), or data arrival from a specific LCH. That is, the BS may transmit information to the UE, and the information may configure measurement of the UL scheduling delay for a MAC SDU, data from a RB, or data from a LCH. After receiving the information, the UE may determine to measure the UL scheduling delay for the configured MAC SDU, RB, or LCH.

In some embodiments of the present application, before transmitting the UL scheduling delay to the BS in step 303, the UE may receive information for triggering the transmission of the UL scheduling delay. The information may be pre-defined or may be transmitted from the BS. In the case that the information is pre-defined, receiving the information may refer to receiving the information inside the UE. Then, after receiving the information, the UE may determine the timing for transmitting the UL scheduling delay.

In an embodiment of the present application, the information may indicate the UE to transmit the UL scheduling delay every time a MAC PDU is transmitted. Then, after receiving the information, the UE may transmit the UL scheduling delay every time a MAC PDU is transmitted, e.g., conveying the UL scheduling delay in either a MAC CE or a MAC sub-header of the MAC PDU.

In another embodiment of the present application, the information may include a period. For example, the period may be defined as a number of subframes or a number of configured grant occurrences. In that case, the UE may transmit the UL scheduling delay periodically based on the period.

In yet another embodiment of the present application, the information may include a threshold. In that case, the UE may transmit the UL scheduling delay in response to the UL scheduling delay being above the threshold.

In yet another embodiment of the present application, the information may include a threshold. In that case, the UE may transmit the UL scheduling delay in response to the UL scheduling delay being above the threshold.

In yet another embodiment of the present application, the information may be a signalling requesting the UL scheduling delay transmitted from the BS. The signalling may be a layer 1 (L1) signalling (e.g., DCI) or a layer 2 (L2) MAC CE. Then, after receiving the signalling, the UE may transmit the UL scheduling delay.

In some embodiments of the present application, before transmitting the UL scheduling delay to the BS in step 303, the UE may receive information regarding formats of the UL scheduling delay to be transmitted. The information may be pre-defined or may be transmitted from the BS. In the case that the information is pre-defined, receiving the information may refer to receiving the information inside the UE. The information may indicate a format of the UL scheduling delay is one of:

an absolute value in a unit of millisecond, e.g., 1 ms, 0.1 ms, 0.01 ms, and so on.

an absolute value in a unit of symbol or slot, e.g., 1 symbol, 1 slot, and so on; and a relative value comparing to a configured grant period value, e.g., the UL scheduling delay can be represented as 2/10 (e.g., 0.2) of the configured grant period value.

Then, after receiving the information, the UE may transmit the UL scheduling delay in a MAC CE of a MAC PDU or in a MAC sub-header by using the format indicated by the information.

Figure 4:
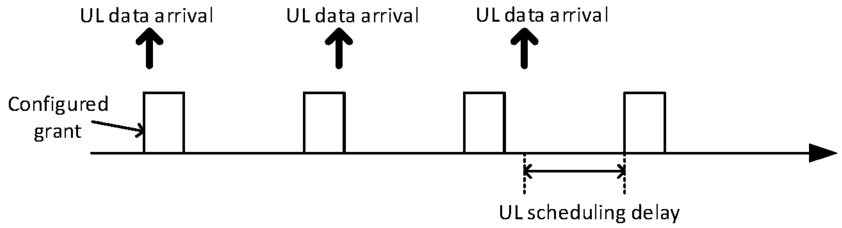
FIG. 4 illustrates an exemplary UL scheduling delay according to some embodiments of the present application.

FIG. 4 illustrates an exemplary UL scheduling delay according to some embodiments of the present application. In the embodiment of FIG. 4, the UL scheduling delay may be equal to a difference between a time of UL data arrival (e.g., one of the above start time points) and a start time of the configured grant for transmitting the MAC PDU.

The above embodiments relate to reporting the UL shedding delay to the BS. However, according to some other embodiments of the present application, to assist the network to configure a proper configured grant for UL transmission, UE may also report the actual data arrival time at the corresponding radio bearer to the network.

In such embodiments, the assistance information may include an UL data arrival time associated with a RB. The RB may be a DRB or a SRB. The UL data arrival time associated with a RB may refer to the time of the UL data arriving at (or in) the RB, which may be determined by a PDCP layer.

In some embodiments of the present application, the assistance information may be transmitted in a PDCP header.

In some embodiments of the present application, before transmitting the UL data arrival time in step 303, the UE may be configured by the BS to measure the UL data arrival time for a specific RB (e.g., a DRB or an SRB). That is, the BS may transmit information to the UE, the information may configure measurement of the UL data arrival time for a RB. After receiving the information, the UE may measure the UL data arrival time for the configured RB.

In some embodiments of the present application, the UL data arrival time is represented in one of the following formats:

a time stamp related to an UL data arrival in the RB;

a frame number related to the UL data arrival in the RB;

a frame number and a subframe number related to the UL data arrival in the RB; and a frame number, a subframe number, and a slot number related to the UL data arrival in the RB.

In some embodiments of the present application, the UL data arrival time is transmitted in the case that an experienced delay in the RB is above a threshold. For example, the experienced delay may be an average PDCP delay in a certain time period, or the delay experienced in the last PDCP PDU transmission. In an embodiment of the present application, the threshold may be configured by the BS.

In some other embodiments of the present application, the UL data arrival time is transmitted in the case that an UL data arrival is a first UL data arrival in the RB for a time period. For example, in the case that the UL data arrival is the first UL data arrival in the RB for a time period, then the UE may transmit the arrival time of the first UL data arrival in the RB to the BS Consequently, in step 304, the BS may receive the assistance information including the UL scheduling delay and/or UL data arrival time from the UE. Then, in step 305, in response to receiving the assistance information from the UE, the BS may transmit updated configuration information to the UE for subsequent UL traffic from the UE. For example, the updated configuration information may include updated configured grant such that the newly updated configured grant can better match the UL data arrival. In step 306, the UE may receive the updated configuration information from the BS. After that, the UE may use the newly updated configuration information for the subsequent UL data transmission.

Steps 305 and 306 may be optional. In some other embodiments of the present application, the BS may not transmit the updated configuration information to the UE. The main purpose of the above embodiments is to report a more accurate and dynamic delay report (e.g., UL scheduling delay or UL data arrival time) to the BS, such that the BS may adjust the configuration information in some cases.

According to some other embodiments of the present application, a UL transmission from the UE may trigger a DL transmission. For example, the UL transmission may be the posing information, after receiving the posing information, the server may take a period of time to perform a rendering process and then send new frames to the UE. During the period of time, the UE may go to a sleep state then then wake up to receive the rendered frames sent in DL.

In such embodiments, the assistance information transmitted from the UE to the BS may include an indication indicating that a UL transmission triggers a DL transmission, e.g., indicating a XR joint rendering between the UE and the server exists. In an embodiment of the present application, the assistance information may be conveyed in a radio resource control RRC message.

After receiving such indication from the UE in step 304, the BS may understand the existence of a service related to "a UL transmission triggers a DL transmission." Then, in step 305, the BS may transmit the updated configuration information to the UE. The updated configuration information may indicate at least one of the following:

one of a quality of service (QoS) flow, a RB, and a LCH to support the UL transmission which triggers the DL transmission;

a first timer, associated with the one of the QoS flow, the RB, and the LCH, for ceasing monitoring a PDCCH. In an embodiment of the present application, the first timer may be configured per QoS flow, RB, or LCH; and a second timer, associated with the one of the QoS flow, the RB, and the LCH, for monitoring the PDCCH. In another embodiment of the present application, the second timer may be configured per QoS flow, RB, or LCH.

Consequently, in step 306, the UE may receive the updated configuration information. Then, the UE may use the updated configuration information to perform a DRX operation.

For example, the UE may perform a UL transmission which includes an UL data from the one of the QoS flow, the RB, and the LCH and triggers a DL transmission, after the UL transmission occurrence, the UE may start the first timer. When the first timer is running, the UE may enter into a DRX sleep state.

In response to the first timer expiry, in the case that the second timer is not included in the updated configuration information, the UE may start an inactivity timer (e.g., drx-InactivityTimer as specified in TS 38.321); in the case that the second timer is included in the updated configuration information, the UE may start the second timer. When the inactivity timer or the second time is running, the UE may monitor the PDCCH for the DL transmission. In the case that the DL transmission is received when the second timer is running, the UE may start the inactivity timer (e.g., drx-InactivityTimer as specified in TS 38.321). In addition, the UE may stop the second timer after starting the inactivity timer.

Figure 5:
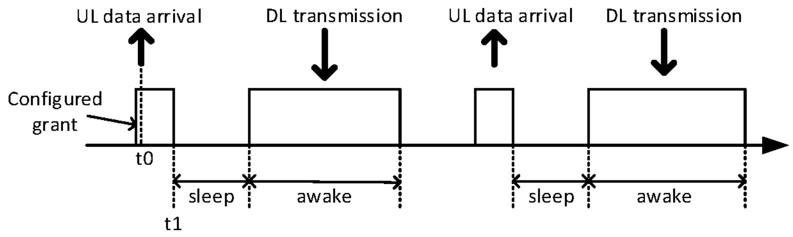
FIG. 5 illustrates an exemplary DRX operation according to some embodiments of the present application.

FIG. 5 illustrates an exemplary DRX operation according to some embodiments of the present application. The DRX operation in FIG. 5 may be performed in the use case where a UL transmission triggers a DL transmission.

Referring to FIG. 5, at time to, the UL data may arrive. The UL data may be from the one of the QoS flow, the RB, and the LCH configured by the BS and triggers a DL transmission. Then, the UE may transmit the UL data in the configured grant. At time t1 (i.e., the end time of the configured grant), the UL transmission is fulfilled. After the UL transmission occurrence (i.e., time t1), the UE may start the first timer and enter into a DRX sleep state. When the first timer is expires, the UE may start the second timer or the inactivity timer and is awake from the sleep state. When the second timer or the inactivity timer is running, the UE may monitor the PDCCH to receive the DL transmission from the BS. The above procedure may be repeated when the next UL data arrives.

Figure 6:
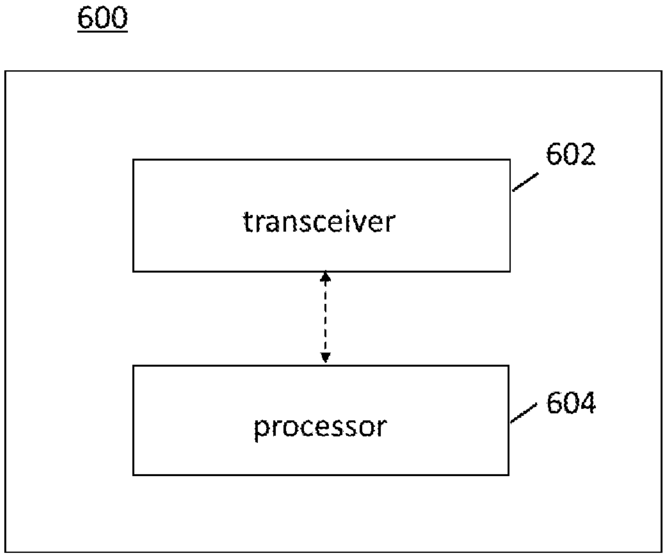
FIG. 6 illustrates a simplified block diagram of an apparatus for UL transmission according to some embodiments of the present application.

FIG. 6 illustrates a simplified block diagram of an exemplary apparatus 600 for UL transmission according to some embodiments of the present application. The apparatus 600 may include a UE (e.g., UE 102*a* or UE 102*b*) or a BS (e.g., a BS 101).

Referring to FIG. 6, the apparatus 600 may include at least one processor 604 and at least one transceiver 602 coupled to the processor 604.

Although in this figure, elements such as the at least one transceiver 602 and processor 604 are described in the singular, the plural is contemplated unless a limitation to the singular is explicitly stated. In some embodiments of the present application, the transceiver 602 may be divided into two devices, such as a receiving circuitry and a transmitting circuitry. In some embodiments of the present application, the apparatus 600 may further include an input device, a memory, and/or other components.

In some embodiments of the present application, the apparatus 600 may be a UE. The processor 604 may be configured to receive configuration information from a BS for UL traffic from the UE; transmit, to the BS, assistance information related to UL traffic that is transmitted from the UE to the BS; and in response to transmitting the assistance information to the BS, receive updated configuration information from the BS for subsequent UL traffic from the UE.

In some embodiments of the present application, the apparatus 600 may be a BS. The processor 604 may be configured to transmit configuration information for UL traffic from a UE to the BS; receive, from the UE, assistance information related to the UL that is transmitted from the UE to the BS; and in response to receiving the assistance information from the UE, transmit, to the UE, updated configuration information to the UE for subsequent UL traffic from the UE.

In some embodiments of the present application, the apparatus 600 may further include at least one non-transitory computer-readable medium. In some embodiments of the present disclosure, the non-transitory computer-readable medium may have stored thereon computer-executable instructions to cause a processor to implement the method with respect to a UE or a BS as described above. For example, the computer-executable instructions, when executed, cause the processor 604 interacting with transceiver 602, so as to perform operations of the methods, e.g., as described in view of any of FIGS. 3-5.

Some embodiments of the present disclosure may be disclosed below:

Embodiment 1: A method performed by a UE, comprising:

- receiving configuration information from a BS for UL traffic from the UE;
- transmitting assistance information related to the UL traffic that is transmitted from the UE to a BS; and
- in response to transmitting the assistance information from the UE to the BS, receiving updated configuration information from the BS for subsequent UL traffic from the UE.

Embodiment 2: The method of Embodiment 1, wherein the assistance information comprises UL scheduling delay.

Embodiment 3: The method of Embodiment 2, wherein the assistance information is transmitted in a MAC CE in a MAC PDU, wherein the MAC CE is associated with a LCH ID.

Embodiment 4: The method of Embodiment 3, further comprising:

- measuring the UL scheduling delay based on a difference between a start time point and a time of a configured grant for transmitting the MAC PDU, wherein the start time point is one of the following:
  - an arrival time of the earliest arriving MAC SDU of all MAC SDUS contained in the MAC PDU to be transmitted;
  - an arrival time of the latest arriving MAC SDU of all MAC SDUs contained in the MAC PDU to be transmitted;
  - an average arrival time of all MAC SDUs contained in the MAC PDU to be transmitted;
  - an arrival time of data earliest arriving at one or more RBs or LCHs, wherein data arriving at one or more RBs or LCHs is contained in the MAC PDU to be transmitted;
  - an arrival time of data latest arriving at one or more RBs or LCHs, wherein data arriving at one or more RBs or LCHs is contained in the MAC PDU to be transmitted; and
  - an average arrival time of data arriving at one or more RBs or LCHs, wherein data arriving at one or more RBs or LCHs is contained in the MAC PDU to be transmitted.

Embodiment 5: The method of Embodiment 3, wherein the assistance information further indicates one or more RBs or LCHs for which the UL scheduling delay is measured.

Embodiment 6: The method of Embodiment 3, wherein the assistance information has a priority higher than a priority of an UL data transmission.

Embodiment 7: The method of Embodiment 1, wherein the assistance information is transmitted in a MAC sub-header in a MAC PDU, wherein the MAC sub-header is associated with a MAC SDU.

Embodiment 8: The method of Embodiment 7, further comprising:

- measuring the UL scheduling delay based on a difference between a start time point and a time of a configured grant for transmitting the MAC PDU, wherein the start time point is one of the following:

an arrival time of the MAC SDU associated with the MAC sub-header; and an arrival time of data arriving at a RB or a LCH associated with the MAC SDU.

Embodiment 9: The method of Embodiment 3 or Embodiment 7, further comprising:

receiving information configuring measurement of the UL scheduling delay for one or more MAC SDUs, data from one or more RBs, or data from one or more LCHs.

Embodiment 10: The method of Embodiment 2, further comprising:

receiving information for transmitting the UL scheduling delay; and in response to the received information, transmitting the UL scheduling delay in one of the following ways:

transmitting the UL scheduling delay every time a MAC PDU is transmitted;

transmitting the UL scheduling delay periodically based on a period;

transmitting the UL scheduling delay in response to the UL scheduling delay being above a threshold; and transmitting the UL scheduling delay in response to receiving a signalling requesting the UL scheduling delay.

Embodiment 11: The method of Embodiment 2, further comprising:

receiving information, wherein the information indicates a format of the UL scheduling delay, and the format of the UL scheduling delay is one of:

an absolute value in a unit of millisecond;

an absolute value in a unit of symbol or slot; and a relative value comparing to a configured grant period value.

Embodiment 12: The method of Embodiment 1, wherein the assistance information comprises an UL data arrival time associated with a RB.

Embodiment 13: The method of Embodiment 12, wherein the UL data arrival time is transmitted in a PDCP header.

Embodiment 14: The method of Embodiment 13, wherein the UL data arrival time is represented in one of the following formats:

a time stamp related to an UL data arrival in the RB;

a frame number related to the UL data arrival in the RB;

a frame number and a subframe number related to the UL data arrival in the RB; and a frame number, a subframe number, and a slot number related to the UL data arrival in the RB.

Embodiment 15: The method of Embodiment 12, wherein the UL data arrival time is transmitted in the case that an experienced delay in the RB is above a threshold or that an UL data arrival is a first UL data arrival in the RB for a time period.

Embodiment 16: The method of Embodiment 12, further comprising:

receiving information configuring measurement of the UL data arrival time for a RB.

Embodiment 17: The method of Embodiment 1, wherein the assistance information comprises an indication indicating that a UL transmission triggers a DL transmission, and wherein the updated configuration information indicates at least one of:

one of a QoS flow, a RB, and a LCH to support the UL transmission which triggers a DL transmission;

a first timer, associated with the one of the QoS flow, the RB, and the LCH, for ceasing monitoring a PDCCH; and a second timer, associated with the one of the QoS flow, the RB, and the LCH, for monitoring the PDCCH.

Embodiment 18: The method of Embodiment 17, further comprising starting the first timer after an UL transmission occurrence, wherein the UL transmission includes an UL data from the one of the QoS flow, the RB, and the LCH and triggers a DL transmission; and entering into a DRX sleep state when the first timer is running.

Embodiment 19: The method of Embodiment 18, further comprising in response to the first timer expiry, starting an inactivity timer in the case that the second timer is not included in the updated configuration information or starting the second timer in the case that the second timer is included in the updated configuration information; and monitoring the PDCCH for the DL transmission when the inactivity timer or the second time is running.

Embodiment 20: The method of Embodiment 19, further comprising in the case that the DL transmission is received when the second time is running, starting the inactivity timer.

Embodiment 21: A method performed by a BS, comprising:

transmitting configuration information for UL traffic from a UE to the BS;

receiving, from the UE, assistance information related to the UL traffic that is transmitted from the UE to the BS; and in response to receiving the assistance information from the UE, transmitting, to the UE, updated configuration information to the UE for subsequent UL traffic from the UE.

Embodiment 22: The method of Embodiment 21, wherein the assistance information comprises UL scheduling delay.

Embodiment 23: The method of Embodiment 22, wherein the assistance information is received in a MAC CE in a MAC PDU, wherein the MAC CE is associated with a LCH ID.

Embodiment 24: The method of Embodiment 23, wherein the assistance information further indicates one or more RBs or a LCHs for which the UL scheduling delay is measured.

Embodiment 25: The method of Embodiment 23, wherein the assistance information has a priority higher than a priority of an UL data transmission.

Embodiment 26: The method of Embodiment 21, wherein the assistance information is received in a MAC sub-header in a MAC PDU, wherein the MAC sub-header is associated with a MAC SDU.

Embodiment 27: The method of Embodiment 23 or Embodiment 26, further comprising:

transmitting information configuring measurement of the UL scheduling delay for one or more MAC SDUs, data from one or more RBs, or data from a one or more LCHs.

Embodiment 28: The method of Embodiment 22, further comprising:

transmitting information for receiving the UL scheduling delay; and in response to the transmitted information, receiving the UL scheduling delay in one of the following ways:

receiving the UL scheduling delay every time a MAC PDU is received;

receiving the UL scheduling delay periodically based on a period;

receiving the UL scheduling delay in response to the UL scheduling delay being above a threshold; and receiving the UL scheduling delay in response to transmitting a signalling requesting the UL scheduling delay.

Embodiment 29: The method of Embodiment 22, further comprising:

transmitting information, wherein the information indicates a format of the UL scheduling delay, and the format of the UL scheduling delay is one of:

an absolute value in a unit of millisecond;

an absolute value in a unit of symbol or slot; and a relative value comparing to a configured grant period value.

Embodiment 30: The method of Embodiment 21, wherein the assistance information comprises an UL data arrival time associated with a RB.

Embodiment 31: The method of Embodiment 30, wherein the UL data arrival time is received in a PDCP header.

Embodiment 32: The method of Embodiment 31, wherein the UL data arrival time is represented in one of the following formats:

a time stamp related to an UL data arrival in the RB;

a frame number related to the UL data arrival in the RB;

a frame number and a subframe number related to the UL data arrival in the RB; and a frame number, a subframe number, and a slot number related to the UL data arrival in the RB.

Embodiment 33: The method of Embodiment 30, wherein the UL data arrival time is received in the case that an experienced delay in the RB is above a threshold or that an UL data arrival is a first UL data arrival in the RB for a time period.

Embodiment 34: The method of Embodiment 30, further comprising:

transmitting information configuring measurement of the UL data arrival time for a RB.

Embodiment 35: The method of Embodiment 21, wherein the assistance information comprises an indication indicating that a UL transmission triggers a DL transmission, and wherein the configuration information indicates at least one of:

one of a QoS flow, a RB, and a LCH to support the UL transmission which triggers a DL transmission;

a first timer, associated with the one of the QoS flow, the RB, and the LCH, for ceasing monitoring a PDCCH; and a second timer, associated with the one of the QoS flow, the RB, and the LCH, for monitoring the PDCCH.

Embodiment 36: A UE, comprising:

a processor; and a transceiver coupled to the processor, wherein the processor is configured to receive configuration information from a BS for UL traffic from the UE transmit, to the BS, assistance information related to UL traffic that is transmitted from the UE to the BS; and in response to transmitting the assistance information to the BS, receive updated configuration information from the BS for subsequent UL traffic from the UE.

Embodiment 37: The UE of Embodiment 36, wherein the assistance information comprises UL scheduling delay.

Embodiment 38: The UE of Embodiment 37, wherein the assistance information is transmitted in a MAC CE in a MAC PDU, wherein the MAC CE is associated with a LCH ID.

Embodiment 39: The UE of Embodiment 38, wherein the processor is further configured to:

measure the UL scheduling delay based on a difference between a start time point and a time of a configured grant for transmitting the MAC PDU, wherein the start time point is one of the following:

an arrival time of the earliest arriving MAC SDU of all MAC SDUs contained in the MAC PDU to be transmitted;

an arrival time of the latest arriving MAC SDU of all MAC SDUs contained in the MAC PDU to be transmitted;

an average arrival time of all MAC SDUs contained in the MAC PDU to be transmitted;

an arrival time of data earliest arriving at one or more RBs or LCHs, wherein data arriving at one or more RBs or LCHs is contained in the MAC PDU to be transmitted;

an arrival time of data latest arriving at one or more RBs or LCHs, wherein data arriving at one or more RBs or LCHs is contained in the MAC PDU to be transmitted; and an average arrival time of data arriving at one or more RBs or LCHs, wherein data arriving at one or more RBs or LCHs is contained in the MAC PDU to be transmitted.

Embodiment 40: The UE of Embodiment 38, wherein the assistance information further indicates one or more RBs or LCHs for which the UL scheduling delay is measured.

Embodiment 41: The UE of Embodiment 38, wherein the assistance information has a priority higher than a priority of an UL data transmission.

Embodiment 42: The UE of Embodiment 36, wherein the assistance information is transmitted in a MAC sub-header in a MAC PDU, wherein the MAC sub-header is associated with a MAC SDU.

Embodiment 43: The UE of Embodiment 42, wherein the processor is further configured to:

measure the UL scheduling delay based on a difference between a start time point and a time of a configured grant for transmitting the MAC PDU, wherein the start time point is one of the following:

an arrival time of the MAC SDU associated with the MAC sub-header; and an arrival time of data arriving at a RB or a LCH associated with the MAC SDU.

Embodiment 44: The UE of Embodiment 38 or 42, wherein the processor is further configured to:

receive information configuring measurement of the UL scheduling delay for one or more MAC SDUs, data from one or more RBs, or data from one or more LCHs.

Embodiment 45: The UE of Embodiment 37, wherein the processor is further configured to:

receive information for transmitting the UL scheduling delay; and in response to the received information, transmit the UL scheduling delay in one of the following ways:

transmit the UL scheduling delay every time a MAC PDU is transmitted;

transmit the UL scheduling delay periodically based on a period;

transmit the UL scheduling delay in response to the UL scheduling delay being above a threshold; and transmit the UL scheduling delay in response to receiving a signalling requesting the UL scheduling delay.

Embodiment 46: The UE of Embodiment 37, wherein the processor is further configured to:

receive information, wherein the information indicates a format of the UL scheduling delay, and the format of the UL scheduling delay is one of:

an absolute value in a unit of millisecond;

an absolute value in a unit of symbol or slot; and a relative value comparing to a configured grant period value.

Embodiment 47: The UE of Embodiment 36, wherein the assistance information comprises an UL data arrival time associated with a RB.

Embodiment 48: The UE of Embodiment 47, wherein the UL data arrival time is transmitted in a packet data convergence protocol (PDCP) header.

Embodiment 49: The UE of Embodiment 48, wherein the UL data arrival time is represented in one of the following formats:

a time stamp related to an UL data arrival in the RB;

a frame number related to the UL data arrival in the RB;

a frame number and a subframe number related to the UL data arrival in the RB; and a frame number, a subframe number, and a slot number related to the UL data arrival in the RB.

Embodiment 50: The UE of Embodiment 47, wherein the UL data arrival time is transmitted in the case that an experienced delay in the RB is above a threshold or that an UL data arrival is a first UL data arrival in the RB for a time period.

Embodiment 51: The UE of Embodiment 47, wherein the processor is further configured to:

receive information configuring measurement of the UL data arrival time for a RB.

Embodiment 52: The UE of Embodiment 36, wherein the assistance information comprises an indication indicating that a UL transmission triggers a DL transmission, and wherein the updated configuration information indicates at least one of:

one of a quality of service (QoS) flow, a RB, and a LCH to support the UL transmission which triggers a DL transmission;

a first timer, associated with the one of the QoS flow, the RB, and the LCH, for ceasing monitoring a PDCCH; and a second timer, associated with the one of the QoS flow, the RB, and the LCH, for monitoring the PDCCH.

Embodiment 53: The UE of Embodiment 52, wherein the processor is further configured to:

start the first timer after an UL transmission occurrence, wherein the UL transmission includes an UL data from the one of the QoS flow, the RB, and the LCH and triggers a DL transmission; and enter into a discontinuous reception (DRX) sleep state when the first timer is running.

Embodiment 54: The UE of Embodiment 53, wherein the processor is further configured to:

in response to the first timer expiry, start an inactivity timer in the case that the second timer is not included in the updated configuration information or starting the second timer in the case that the second timer is included in the updated configuration information; and monitor the PDCCH for the DL transmission when the inactivity timer or the second time is running.

Embodiment 55: The UE of Embodiment 54, wherein the processor is further configured to:

in the case that the DL transmission is received when the second time is running, start the inactivity timer.

Embodiment 56: A BS, comprising:

a processor; and a transceiver coupled to the processor, wherein the processor is configured to transmit configuration information for UL traffic from a UE to the BS;

receive, from the UE, assistance information related to the UL that is transmitted from the UE to the BS; and in response to receiving the assistance information from the UE, transmit, to the UE, updated configuration information to the UE for subsequent UL traffic from the UE.

Embodiment 57: The BS of Embodiment 56, wherein the assistance information comprises UL scheduling delay.

Embodiment 58: The BS of Embodiment 57, wherein the assistance information is received in a MAC CE in a MAC PDU, wherein the MAC CE is associated with a LCH ID.

Embodiment 59: The BS of Embodiment 58, wherein the assistance information further indicates one or more RBs or a LCHs for which the UL scheduling delay is measured.

Embodiment 60: The BS of Embodiment 58, wherein the assistance information has a priority higher than a priority of an UL data transmission.

Embodiment 61: The BS of Embodiment 56, wherein the assistance information is received in a MAC sub-header in a MAC PDU, wherein the MAC sub-header is associated with a MAC SDU.

Embodiment 62: The BS of Embodiment 58 or Embodiment 61, wherein the processor is further configured to:

transmit information configuring measurement of the UL scheduling delay for one or more MAC SDUs, data from one or more RBs, or data from a one or more LCHs.

Embodiment 63: The BS of Embodiment 57, wherein the processor is further configured to:

transmit information for receiving the UL scheduling delay; and in response to the transmitted information, receive the UL scheduling delay in one of the following ways:

receive the UL scheduling delay every time a MAC PDU is received;

receive the UL scheduling delay periodically based on a period;

receive the UL scheduling delay in response to the UL scheduling delay being above a threshold; and receive the UL scheduling delay in response to transmitting a signalling requesting the UL scheduling delay.

Embodiment 64: The BS of Embodiment 57, wherein the processor is further configured to:

transmit information, wherein the information indicates a format of the UL scheduling delay, and the format of the UL scheduling delay is one of:

an absolute value in a unit of millisecond;

an absolute value in a unit of symbol or slot; and a relative value comparing to a configured grant period value.

Embodiment 65: The BS of Embodiment 56, wherein the assistance information comprises an UL data arrival time associated with a RB.

Embodiment 66: The BS of Embodiment 65, wherein the UL data arrival time is received in a packet data convergence protocol (PDCP) header.

Embodiment 67: The BS of Embodiment 66, wherein the UL data arrival time is represented in one of the following formats:

a time stamp related to an UL data arrival in the RB;

a frame number related to the UL data arrival in the RB;

a frame number and a subframe number related to the UL data arrival in the RB; and a frame number, a subframe number, and a slot number related to the UL data arrival in the RB.

Embodiment 68: The BS of Embodiment 65, wherein the UL data arrival time is received in the case that an experienced delay in the RB is above a threshold or that an UL data arrival is a first UL data arrival in the RB for a time period.

Embodiment 69: The BS of Embodiment 65, wherein the processor is further configured to:

transmitting information configuring measurement of the UL data arrival time for a RB.

Embodiment 70: The BS of Embodiment 56, wherein the assistance information comprises an indication indicating that a UL transmission triggers a downlink (DL) transmission, and wherein the configuration information indicates at least one of:

one of a QoS flow, a RB, and a LCH to support the UL transmission which triggers a DL transmission;

a first timer, associated with the one of the QoS flow, the RB, and the LCH, for ceasing monitoring a PDCCH; and a second timer, associated with the one of the QoS flow, the RB, and the LCH, for monitoring the PDCCH.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for data and signaling transmission, including a processor and a memory. Computer programmable instructions for implementing a method for data and signaling transmission are stored in the memory, and the processor is configured to perform the computer programmable instructions to implement the method for data and signaling transmission. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for UL transmission as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A user equipment (UE) for wireless communication, comprising:

at least one memory; and at least one processor coupled with the at least one memory and configured to cause the UE to:

receive configuration information from a base station (BS) for uplink (UL) traffic from the UE;

measure an UL scheduling delay based on a difference between a start time point and a time of a configured grant for transmitting a medium access control (MAC) protocol data unit (PDU), wherein the start time point comprises at least an arrival time of an earliest MAC service data unit (SDU) of all MAC SDUs contained in the MAC PDU to be transmitted;

transmit, to the BS, assistance information related to UL traffic that is transmitted from the UE to the BS, wherein the assistance information comprises the UL scheduling delay; and in response to transmitting the assistance information to the BS, receive updated configuration information from the BS for subsequent UL traffic from the UE.

2. The UE of claim 1, wherein the at least one processor is configured to cause the UE to: transmit the assistance information in a MAC control element (CE) in the MAC PDU, wherein the MAC CE is associated with a logical channel (LCH) identity (ID).

3. The UE of claim 2, wherein the start time point further comprises at least one of:

an arrival time of a latest arriving MAC SDU of all the MAC SDUs contained in the MAC PDU to be transmitted;

an average arrival time of all the MAC SDUs contained in the MAC PDU to be transmitted;

an arrival time of data earliest arriving at one or more radio bearers or logical channels (LCHs), wherein the data earliest arriving at one or more radio bearers or LCHs is contained in the MAC PDU to be transmitted;

an arrival time of data latest arriving at one or more radio bearers or LCHs, wherein the data latest arriving at one or more radio bearers or LCHs is contained in the MAC PDU to be transmitted; or an average arrival time of data arriving at one or more radio bearers or LCHs, wherein the data arriving at one or more radio bearers or LCHs is contained in the MAC PDU to be transmitted.

4. The UE of claim 1, wherein the at least one processor is configured to cause the UE to: transmit the assistance information in a MAC sub-header in the MAC PDU, wherein the MAC sub-header is associated with a MAC SDU.

5. The UE of claim 4, wherein the start time point further comprises at least one of:

an arrival time of the MAC SDU associated with the MAC sub-header; or an arrival time of data arriving at a resource block (RB) or a logical channel (LCH) associated with the MAC SDU.

6. The UE of claim 1, wherein the at least one processor is further configured to cause the UE to:

receive information for transmitting the UL scheduling delay; and in response to the received information, transmit the UL scheduling delay including one or more of to:

transmit the UL scheduling delay when the MAC PDU is transmitted;

transmit the UL scheduling delay periodically based on a period;

transmit the UL scheduling delay in response to the UL scheduling delay being above a threshold; or transmit the UL scheduling delay in response to receiving a signalling requesting the UL scheduling delay.

7. The UE of claim 1, wherein the assistance information comprises an UL data arrival time associated with a resource block (RB).

8. The UE of claim 7, wherein the at least one processor is configured to cause the UE to: transmit the UL data arrival time in a packet data convergence protocol (PDCP) header.

9. The UE of claim 7, wherein the at least one processor is configured to cause the UE to: transmit the UL data arrival time based at least in part on one or more of an experienced delay in the RB being above a threshold or that an UL data arrival is a first UL data arrival in the RB for a time period.

10. The UE of claim 1, wherein the assistance information comprises an indication indicating that a UL transmission triggers a downlink (DL) transmission, and wherein the updated configuration information indicates at least one of:

one or more of a quality of service (QoS) flow, a resource block (RB), or a logical channel (LCH) to support the UL transmission which triggers the DL transmission;

a first timer, associated with the one or more of the QoS flow, the RB, and the LCH, for ceasing monitoring a physical downlink control channel (PDCCH); or a second timer, associated with the one or more of the QoS flow, the RB, or the LCH, for monitoring the PDCCH.

11. The UE of claim 10, wherein the at least one processor is further configured to cause the UE to:

when the updated configuration information indicates at least the first timer, start the first timer after the UL transmission, wherein the UL transmission includes an UL data from the one or more of the QoS flow, the RB, or the LCH and triggers the DL transmission; and enter into a discontinuous reception (DRX) sleep state when the first timer is running.

12. The UE of claim 11, wherein the at least one processor is further configured to cause the UE to, in response to expiry of the first timer:

one or more of start an inactivity timer when the second timer is not included in the updated configuration information or start the second timer when the second timer is included in the updated configuration information; and monitor the PDCCH for the DL transmission when one or more of the inactivity timer or the second timer is running.

13. The UE of claim 12, wherein the at least one processor is further configured to cause the UE to:

in an event that the DL transmission is received when the second timer is running, start the inactivity timer.

14. A base station (BS) for wireless communication, comprising:

at least one memory; and at least one processor coupled with the at least one memory and configured to cause the BS to:

transmit configuration information for uplink (UL) traffic from a user equipment (UE) to the BS;

receive, from the UE, assistance information related to the UL traffic that is transmitted from the UE to the BS, wherein the assistance information comprises an UL scheduling delay that is based on a difference between a start time point and a time of a configured grant for receiving a medium access control (MAC) protocol data unit (PDU), and wherein the start time point comprises at least an arrival time of an earliest MAC service data unit (SDU) of all MAC SDUs contained in the MAC PDU to be received; and in response to receiving the assistance information from the UE, transmit, to the UE, updated configuration information for subsequent UL traffic from the UE.

15. A method performed by a user equipment (UE), the method comprising:

receiving configuration information from a base station (BS) for uplink (UL) traffic from the UE;

measuring an UL scheduling delay based on a difference between a start time point and a time of a configured grant for transmitting a medium access control (MAC) protocol data unit (PDU), wherein the start time point comprises at least an arrival time of an earliest MAC service data unit (SDU) of all MAC SDUs contained in the MAC PDU to be transmitted;

transmitting, to the BS, assistance information related to UL traffic that is transmitted from the UE to the BS, wherein the assistance information comprises the UL scheduling delay; and in response to transmitting the assistance information to the BS, receiving updated configuration information from the BS for subsequent UL traffic from the UE.

16. The method of claim 15, further comprising:

transmitting the assistance information in a MAC control element (CE) in the MAC PDU, wherein the MAC CE is associated with a logical channel (LCH) identity (ID).

17. The method of claim 16, wherein the start time point further comprises at least one of:

an arrival time of a latest arriving MAC SDU of all the MAC SDUs contained in the MAC PDU to be transmitted;

an average arrival time of all the MAC SDUs contained in the MAC PDU to be transmitted;

an arrival time of data earliest arriving at one or more radio bearers (RBs) or logical channels (LCHs), wherein the data earliest arriving at one or more RBs or LCHs is contained in the MAC PDU to be transmitted;

an arrival time of data latest arriving at one or more RBs or LCHs, wherein the data latest arriving at one or more RBs or LCHs is contained in the MAC PDU to be transmitted; or an average arrival time of data arriving at one or more RBs or LCHs, wherein the data arriving at one or more RBs or LCHs is contained in the MAC PDU to be transmitted.

18. The BS of claim 14, wherein the at least one processor is configured to cause the BS to: receive the assistance information in a MAC control element (CE) in the MAC PDU, wherein the MAC CE is associated with a logical channel (LCH) identity (ID).

19. The BS of claim 18, wherein the start time point further comprises at least one of:

an arrival time of a latest arriving MAC SDU of all the MAC SDUs contained in the MAC PDU to be transmitted;

an average arrival time of all the MAC SDUs contained in the MAC PDU to be transmitted;

an arrival time of data earliest arriving at one or more radio bearers (RBs) or logical channels (LCHs), wherein the data earliest arriving at one or more RBs or LCHs is contained in the MAC PDU to be transmitted;

an arrival time of data latest arriving at one or more RBs or LCHs, wherein the data latest arriving at one or more RBs or LCHs is contained in the MAC PDU to be transmitted; or an average arrival time of data arriving at one or more RBs or LCHs, wherein the data arriving at one or more RBs or LCHs is contained in the MAC PDU to be transmitted.

20. A method performed by a base station (BS), the method comprising:

transmitting configuration information for uplink (UL) traffic from a user equipment (UE) to the BS;

receiving, from the UE, assistance information related to the UL traffic that is transmitted from the UE to the BS, wherein the assistance information comprises an UL scheduling delay that is based on a difference between a start time point and a time of a configured grant for receiving a medium access control (MAC) protocol data unit (PDU), and wherein the start time point comprises at least an arrival time of an earliest MAC service data unit (SDU) of all MAC SDUs contained in the MAC PDU to be received; and in response to receiving the assistance information from the UE, transmitting, to the UE, updated configuration information for subsequent UL traffic from the UE.

* * * * *